United States Patent [19]

Malmendier

[11] 3,754,980

[45] Aug. 28, 1973

[54] DEVITRIFICATION-RESISTANT COATING FOR HIGH-SILICA GLASSES

[75] Inventor: Joseph W. Malmendier, Painted Post, N.Y.

[73] Assignee: Corning Glass Works, Corning, N.Y.

[22] Filed: Aug. 6, 1971

[21] Appl. No.: 169,824

[52] U.S. Cl.................. 117/124 A, 65/30, 106/47, 106/48, 106/52, 117/46 FC, 117/125
[51] Int. Cl.....................C03c 17/02, C03c 5/00
[58] Field of Search................... 117/46 FC, 123 A, 117/124 A, 125; 106/47 R, 47 A, 48, 52, 39 DV; 65/30, 33

[56] References Cited
UNITED STATES PATENTS

| | | | |
|---|---|---|---|
| 2,351,974 | 6/1944 | Kollmar | 106/48 |
| 2,995,468 | 8/1961 | Steiger | 106/48 |
| 2,396,873 | 3/1946 | Morrison et al. | 117/124 A |
| 3,055,762 | 9/1962 | Hoffman | 117/124 A |
| 3,637,425 | 1/1972 | McMillan et al. | 117/125 |
| 3,539,387 | 11/1970 | Kelly et al. | 117/125 |
| 3,540,896 | 11/1970 | Flicker | 117/46 FC |
| R21,175 | 8/1939 | Morey | 106/47 Q |
| 3,414,465 | 12/1968 | Baak et al. | 117/125 |

OTHER PUBLICATIONS

King et al., "Some Properties of Tantale Systems," (Abstract), Nuclear Science Abstracts, Vol. 10, (1956), pp. 995–95.

Reeder et al., "Ceramic Adhesive Bonding of Refractory Metals–A Preliminary Investigation," Bull. of Am. Ceramic Soc., Vol. 42, (1963), pp. 337–39.

*Primary Examiner*—William D. Martin
*Assistant Examiner*—William H. Schmidt
*Attorney*—Clarence R. Patty, Jr., Kees van der Sterne et al.

[57] ABSTRACT

A devitrification-resistant glaze for high-silica glasses, particularly effective in inhibiting surface devitrification at elevated temperatures under highly alkaline conditions, formed from a coating consisting essentially of $Ta_2O_5$ but also containing up to about 85 percent by weight $Al_2O_3$ and up to about 50 percent by weight $SiO_2$. The coating is preferably applied in the form of an aqueous slurry which is dried and fired to produce a vitreous glaze.

3 Claims, No Drawings

DEVITRIFICATION-RESISTANT COATING FOR HIGH-SILICA GLASSES

BACKGROUND OF THE INVENTION

The coatings of the present invention are related to the coatings described in the co-pending U.S. Pat. application of T. H. Elmer and J. W. Malmendier, Ser. No. 169,823, filed concurrently and commonly assigned herewith. However, glazes produced from the coatings described in the co-pending application are useful primarily in inhibiting devitrification in high-silica glasses induced by contact with food-ash at elevated temperatures.

This invention has applicability principally in the field of high-silica and fused silica glasses. Devitrification of these glasses, rather than softening, often limits their use temperature and duration of use. For this reason, means for stopping or retarding surface devitrification in high-silica glasses have long been sought. The rates of devitrification of the glass depend on many variables, including the amounts of impurities in the glass, the moisture content of the glass-making materials used, the temperature of the environment, and the composition of the ambient atmosphere. Since it is difficult to regulate these variables during the actual use of the material, it would be desirable to develop a glaze which could inhibit devitrification of high-silica glasses independently of these variables under all types of conditions. Among the conditions which are known to induce devitrification in high-silica glasses are elevated temperatures and highly alkaline conditions, such as might be encountered in alkali metal vapor lamps or highly alkaline solutions or atmospheres.

Earlier attempts by others to inhibit devitrification in high-silica glasses centered on additions of $ZrO_2$, $TiO_2$, or $Al_2O_3$ to the glass as dopants, but with inconsistent results. A very complete literature review is given up to the year 1957 in the thesis of S. D. Brown, entitled "The Devitrification of High Temperature Glass," Ph. D. Thesis, University of Utah (1957). This survey of the literature on devitrification was extended to 1962 by F. E. Wagstaff in "Kinetics of Crystallization of Vitreous Silica," Ph. D. Thesis, University of Utah (1962). The devitrification of high-silica glasses usually results in the formation of cristobalite. An excellent description of the process is given by Ainslie et al., in a paper presented at the 1962 Symposium on the Nucleation and Crystallization of Glass.

In the present work, protection from devitrification was sought by the formation of surface glazes. Glazing is easily adapted to production and not likely to interfere with the bulk properties of a glass. The objective was to inhibit devitrification under the extremely adverse conditions of an alkali-rich atmosphere at elevated temperatures, e.g., above about 700°C., since it was felt that a protective glaze which was successful in inhibiting devitrification under such conditions would also protect the glass under other conditions tending to induce devitrification.

SUMMARY OF THE INVENTION

I have now discovered certain protective glaze compositions which are quite effective in inhibiting devitrification in high-silica glasses at elevated temperatures under highly alkaline conditions. These glazes consist essentially of $Ta_2O_5$, but may also contain significant quantities of $Al_2O_3$ and $SiO_2$. They are formed by applying to the glass a coating consisting essentially of the described oxides, or of compounds thermally decomposable to yield the described oxides in specified proportions, and then firing the coating to cause it to react with the glass to produce a vitreous glaze. The coating is preferably applied in the form of an aqueous slurry or suspension of the desired compounds, then dried, and finally reacted with the surface of the glass by heating with a gas-oxygen flame, although other methods of deposition such as plasma spraying, flame spraying, or vapor deposition would also be suitable. Coatings suitable for use in producing the glazes of the invention may consist, on the oxide basis, that is, on the basis of the composition of the oxide mixture resulting when the coating is oxidized on firing, of about 15–100 percent $Ta_2O_5$, 0–85 percent $Al_2O_3$, and 0–50 percent $SiO_2$ by weight. Especially preferred are coatings consisting essentially, in weight percent on the oxide basis, of about 55–65 percent $Ta_2O_5$ and 35–45 percent $SiO_2$ and coatings consisting essentially in weight percent on the oxide basis, of about 25–35 percent $Ta_2O_5$ and 65–75 percent $Al_2O_3$.

DESCRIPTION OF THE PREFERRED EMBODIMENTS

The glazes produced from the coatings of the present invention are particularly suitable for use with fused silica and with high-silica glasses such as reconstructed 96 percent silica glass. Examples of the latter include Corning Code 7913 glass. These materials are presently used for numerous high temperature applications, such as lamp envelopes, heat sheaths for electric heating elements, and furnace window glasses, where devitrification poses a problem which can be alleviated through the use of the glazes of the present invention. However, the glazes of the present invention have also been applied to glasses containing as little as 80 percent silica by weight with good results.

The single essential constituent of the protective glazes of the invention is $Ta_2O_5$. While $Al_2O_3$ has been shown to have some beneficial effect in inhibiting devitrification when used in conjunction with $Ta_2O_5$, I have found that coatings consisting essentially of $Al_2O_3$ alone do not provide the devitrification resistance required for high temperature applications under highly alkaline conditions, and can under some circumstances actually act as a positive catalyst for devitrification. The presence of $SiO_2$ in the glazes of the invention does not appear to improve the protective capability thereof, but $SiO_2$ is helpful in forming a stable colloidal suspension of $Ta_2O_5$ which is required to obtain uniform distribution of $Ta_2O_5$ on the surface to be protected. Hence, I have found that, while glazes produced from coatings consisting essentially of $Ta_2O_5$ are suitable for the purpose of providing devitrification protection according to the present invention, the coatings may also contain up to about 85 percent by weight $Al_2O_3$ and up to about 50 percent $SiO_2$, provided the $Ta_2O_5$ content does not fall below about 15 percent by weight. Suitable coatings, therefore, consist, in weight percent on the oxide basis, of about 15–100 percent $Ta_2O_5$, 0–85 percent $Al_2O_3$, and 0–50 percent $SiO_2$. Especially preferred for ease of application and compatibility with high silica substrates in terms of thermal and physical properties are coatings consisting essentially, in weight percent on the oxide basis, of about 25–35 percent $Ta_2O_5$ and 65–75 percent $Al_2O_3$, and coatings consisting essentially, in weight percent on the oxide basis, of about 55–65 percent $Ta_2O_5$ and 35–45 percent $SiO_2$. The exact compositions of the glazes produced from the desired coatings are not readily determined, since the glazes are a reaction product of the coatings and the glass substrate.

My preferred method of applying the coatings of the present invention involves the use of a slurry or suspension of the desired oxides, or compounds thermally decomposable to the desired oxides, in water. The steps of the method normally comprise preparing an aqueous suspension consisting essentially of a coating component and a water component, wherein the coating component consists essentially of compounds which, upon firing, will yield, in weight percent on the oxide basis, about 15–100 percent $Ta_2O_5$, 0–85 percent $Al_2O_3$, and 0–50 percent $SiO_2$, said coating component comprising about 4–15 percent by weight of the suspension, applying the suspension to the glass article to be treated, drying the suspension on the glass to form an evaporation product layer, and firing the evaporation product layer to form a vitreous protective glaze on the glass. While in many cases the oxides themselves will comprise the coating component of the suspension, and thus, the evaporation product layer, other compounds may be substituted which will yield the required oxides in the desired proportions upon firing the evaporation product layer to form a vitreous glaze. Thus, I prefer to use $TaCl_5$ rather than $Ta_2O_5$ in preparing suspensions according to the present invention because it dissolves easily and reacts readily with the substrate. This merely involves incorporating $TaCl_5$ into the suspension in quantities such that the fired coating will contain about 15–100 percent $Ta_2O_5$, as calculated in weight percent on the oxide basis, from the proportions of the coating compounds contained in the slurry.

Insoluble solids used in making up the slurry, such as $SiO_2$ and $Al_2O_3$, should have a particle size small enough to be both readily mixed and reasonably stable in suspension. Of course, volatile solvents other than water may be used to form the suspension, if desired.

I have also found it desirable, in preparing the aqueous suspensions described, to adjust the pH thereof with, for example, HCl or $NH_4OH$, in order to improve the stability of the suspension. Preferably, the pH of the slurries prepared as described will range between about 8 and 9, as the result of minor additions of either of these two compounds.

The preferred method for applying the slurries to the glass articles to be protected comprises dipping the glass into the slurries. In applying the slurry, care must be taken not to obtain an excessively thick coating. It has been found that there is a thermal expansion difference between the glazes of the invention and the high-silica base glasses to which they will normally be applied, and crazing has been observed in excessively thick glazes as a result of this expansion difference. Glazes ranging in thickness after firing from about 10–50 microns are sufficient to provide good devitrification protection while avoiding the problem of crazing, particularly if the preferred compositions are used. Glazes within this thickness range are readily obtained by a single dip coating in slurries having a solids content in the range from about 7–14 percent by weight.

After applying the slurries to the glass, the moisture should be removed from the coating prior to firing. The drying process may be accelerated by heating, for example, in an oven, under a heat lamp, or with a flame, if desired. However, excessively rapid heating should be avoided because it may cause peeling and crazing of the coating.

Following drying, the coating is fired to a temperature sufficient to cause the fusion and interaction thereof with the glass substrate. I have found that this can conveniently be accomplished with the air of a natural gas-oxygen flame without the need for heating the entire glass article to the temperature at which the coating will fuse to form a vitreous layer. Hence, sufficient heating to cause reaction of the coating with the glass substrate to form the vitreous glaze can be obtained simply by directing a gas-oxygen flame onto the area of the coating to be reacted for a period of several seconds or until the coating has been converted to the vitreous state as the result of interaction with the high-silica glass substrate.

The effectiveness of glazes provided according to the described method in inhibiting devitrification of high-silica glasses was determined by a series of experiments wherein several Corning Code 7913 (96 percent silica) glass plates, each having a portion of its surface protected by a glaze, were subjected to a highly alkaline atmosphere at elevated temperatures. The composition of the protective glazes varied from sample to sample so that the effect of coating composition on the protective qualities of the glazes could be judged. The test conditions comprised placing each partially-coated sample over a crucible containing 1 gram of sodium carbonate so that the sample acted as a cover having a portion of its surface protected by the glaze to be tested. Each crucible, cover, and contents were then placed in a furnace, heated to a temperature of 1,000°C., and maintained at that temperature for 16 hours. At the end of this test period, the furnace and contents were cooled and the cover plates were removed and examined for devitrification. In each case, the unprotected portions of the cover plates were severely devitrified, while the protected portions exhibited varying degrees of devitrification depending upon the protective capabilities of each composition. Representative results of these tests are set forth in Table I below, which lists the results for several different coating compositions and compares the degree of devitrification observed in the uncoated portion with that observed in the glazed portion in each case. The degree of devitrification was judged on a qualitative basis, with extensive surface crystallization and crazing being termed severe, and light surface crystallization typified by a hazy surface appearance being termed slight. In the case of coatings within the range of compositions of the invention, no surface haze or crystallization could be detected in the glazed surface regions of any of the samples.

TABLE I

Surface Devitrification – Code 7913 Plates
Sodium-Rich Atmosphere – 16 Hours at 1,000° C.

| Sample | Coating Composition | Devitrification Unglazed Region | Glazed Region |
|---|---|---|---|
| 1 | 100% $Ta_2O_5$ | severe | none |
| 2 | 60% $Ta_2O_5$–40% $SiO_2$ | severe | none |
| 3 | 50% $Ta_2O_5$–50% $Al_2O_3$ | severe | none |
| 4 | 30% $Ta_2O_5$–70% $Al_2O_3$ | severe | none |
| 5 | 20% $Ta_2O_5$–80% $Al_2O_3$ | severe | none |
| 6 | 10% $Ta_2O_5$–90% $Al_2O_3$ | severe | slight |
| 7 | 100% $Al_2O_3$ | severe | slight |

$Ta_2O_5$-containing glazes were also applied to vitreous fused silica and other silicate glasses with good results. In one series of tests, a coating consisting essentially of 50 percent $Ta_2O_5$ and 50 percent $SiO_2$ by weight was applied to portions of the surfaces of both vitreous fused silica plates and plates of a borosilicate glass containing about 80 percent silica by weight, and reacted to form a glaze. These plates were then subjected to test conditions similar to those described above, except that a temperature of 800°C. rather than 1,000°C. was maintained during the $Na_2CO_3$ exposure period. In both cases, the glazed surface regions of the test plates were completely protected from devitrification, whereas the unglazed surface regions exhibited moderate to severe devitrification. Accordingly, it has been concluded that the glazes of the present invention are suitable for providing some degree of devitrification protection to most silicate glasses under highly alkaline conditions at elevated temperatures.

The invention may be further understood by reference to the following detailed examples, which illustrate the best mode contemplated by the inventor for carrying out his invention.

EXAMPLE I

A 400 ml. beaker containing 94 ml. of $H_2O$ was placed under a propeller-type variable-speed mixer and stirring was started at a medium speed. Approximately 3.5 grams of powdered alumina, having particle sizes in the range from about 0.01–0.05 microns, was slowly added to the water in the beaker while stirring was continued. Next, approximately 2.5 grams of $TaCl_5$ was added to the mixture while stirring was continued. This quantity of $TaCl_5$ will yield approximately 1.5 grams of $Ta_2O_5$ upon firing, so that the final coating was calculated to contain about 70 percent $Al_2O_3$ and 30 percent $Ta_2O_5$ by weight. The pH of the slurry was adjusted to about 9.0 through the addition of $NH_4OH$, and the mixer was then turned off. A 1½ inch square Corning Code 7913 glass plate about 4 millimeters in thickness and consisting of about 96 percent silica by weight was then partially dipped in the slurry for about 30 seconds, removed, and air dried until visible moisture was no longer evident. It was then further dried with a yellow gas flame, having a temperature estimated to be about 650°C. Following drying, the coating was reacted with the substrate by heating with a gas-oxygen flame. The coating was completely transformed into a vitreous layer by flame treating for a few seconds. After the treatment, the coated and uncoated materials could not be distinguished by visual inspection.

EXAMPLE II

The glazed sample prepared according to Example I was subjected along with an unglazed sample having the same composition to a devitrification test as hereinbefore described, wherein each sample was placed over a crucible, each crucible, plate and contents then heated to a temperature of 1,000°C. in a furnace, and maintained at that temperature for 16 hours. Following this treatment the samples were cooled and examined, and it was determined that, while the unglazed plate had severely devitrified, the plate protected by the glaze prepared according to Example I was completely vitreous and suffered no apparent surface crystallization.

EXAMPLE III

A slurry was prepared according to the procedure outlined in Example I, except that 4 grams of powdered silica, having an average particle size of about 0.01 microns, and 6 grams of $Ta_2O_5$ were successively added to 90 ml. of $H_2O$, so that the final coating would contain 60 percent $Ta_2O_5$ and 40 percent $SiO_2$ by weight. The pH of this slurry was adjusted to about 8.0 through the addition of $NH_4OH$. A Corning Code 7913 glass plate was coated with the slurry, dried, and fired as described in Example I. Both glazed and unglazed samples were then subjected to devitrifying conditions as described in Example II, and subsequently examined. It was found that, while the unglazed plate had severely devitrified, the plate protected by the protective glaze applied as described was completely vitreous, exhibiting no visible surface crystallization.

From the above examples, it has been concluded that the protective glazes of the invention offer a useful solution to the problem of surface devitrification of high-silica glasses under alkaline conditions at elevated temperatures.

I claim:

1. A high-silica glass article coated with a devitrification-resistant glaze formed by firing onto said article a coating consisting essentially, in weight percent on the oxide basis, of about 15–100 percent $Ta_2O_5$, 0–85 percent $Al_2O_3$, and 0–50 percent $SiO_2$.

2. A high-silica glass article according to claim 1 wherein said coating consists essentially, in weight percent on the oxide basis, of about 55–65 percent $Ta_2O_5$ and 35–45 percent $SiO_2$, and wherein said glaze has a thickness in the range from about 10–50 microns.

3. A high-silica glass article according to claim 1 wherein said coating consists essentially, in weight percent on the oxide basis, of about 25–35 percent $Ta_2O_5$ and 65–75 percent $Al_2O_3$, and wherein said glaze has a thickness in the range from about 10–50 microns.

* * * * *